UNITED STATES PATENT OFFICE.

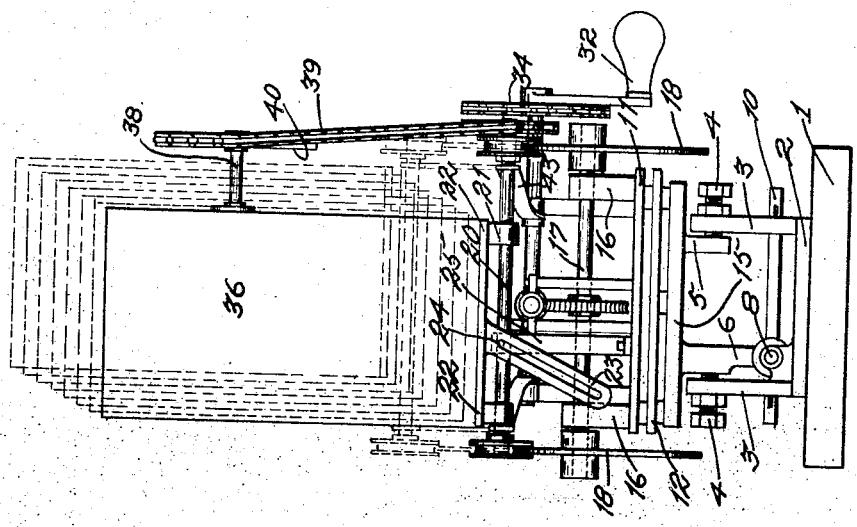

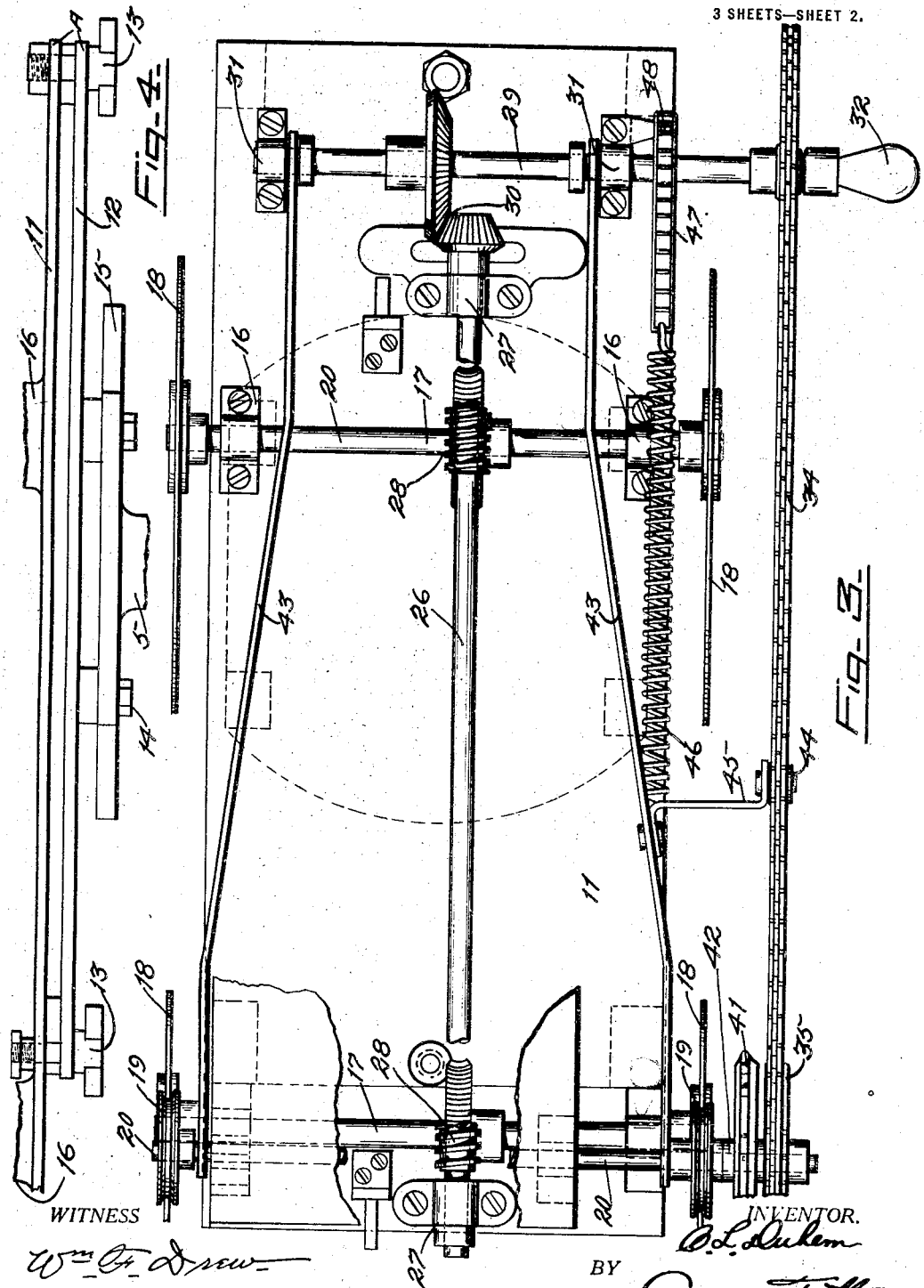

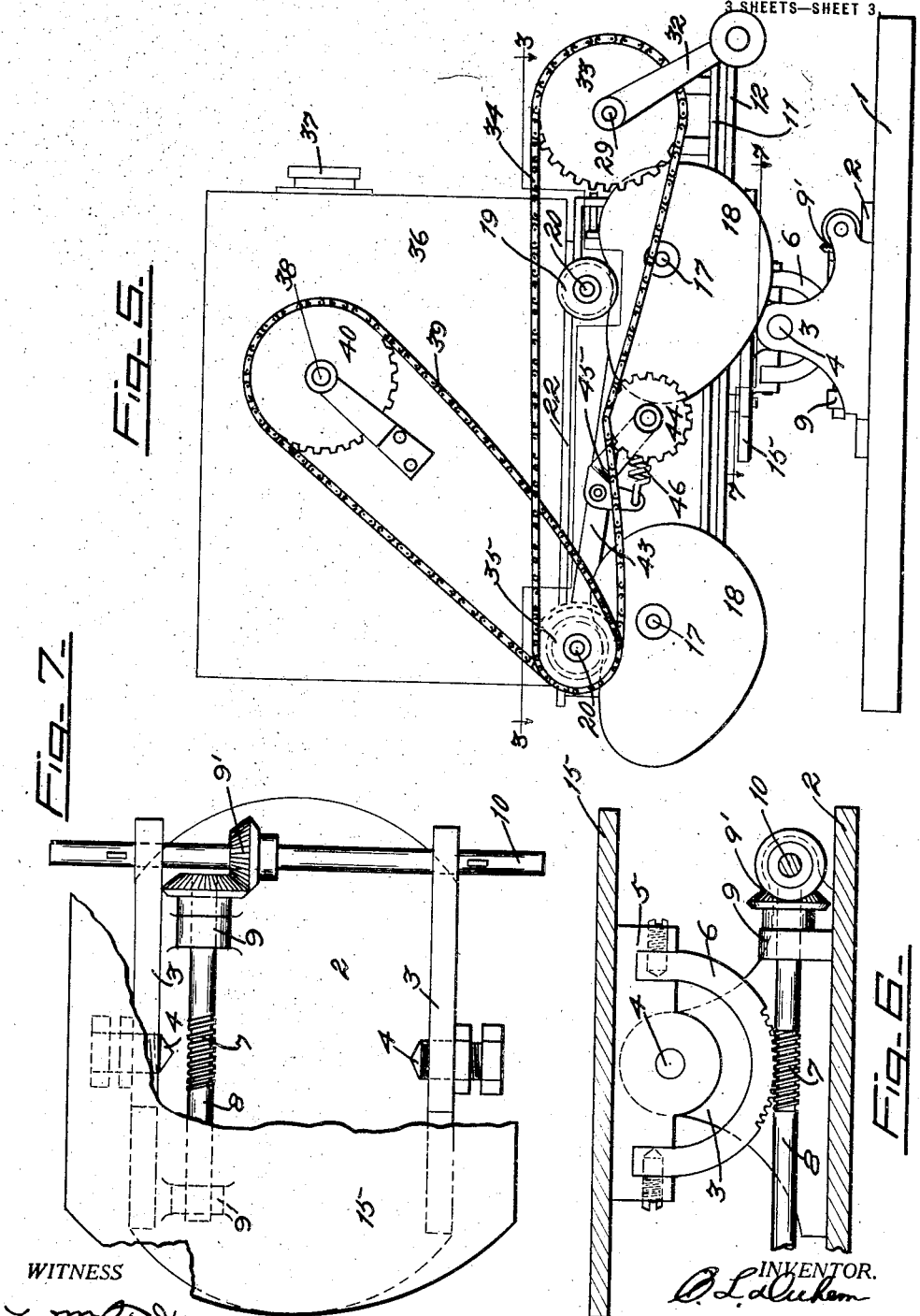

CONSTANT L. DUHEM, OF OROVILLE, CALIFORNIA.

MOVABLE CAMERA-SUPPORT.

1,243,272.   Specification of Letters Patent.   Patented Oct. 16, 1917.

Application filed March 11, 1916. Serial No. 83,559.

*To all whom it may concern:*

Be it known that I, CONSTANT L. DUHEM, a citizen of the United States, residing at Oroville, in the county of Butte and State of California, have invented certain new and useful Improvements in Movable Camera-Supports, of which the following is a specification.

In the taking of motion pictures it has been found necessary in some cases, in order to obtain the desired results, to move or change the position of the camera during the operation of the shutter, as, for instance, in the taking of panoramic pictures the camera is moved horizontally, and the present invention relates to a simple and efficient mechanism for moving a camera vertically and horizontally at an oblique angle, to simultaneously operating the shutter to obtain successive negatives taken from different angles relatively to the object.

The invention consists broadly in providing a moving platform on which the camera is mounted and connecting therewith means for raising and lowering the platform vertically at an oblique angle and for operating the shutter simultaneously with the rise and fall of the camera.

This invention is designed primarily for the taking of motion pictures which when projected will appear in relief or as having depth when viewed by the observer, as in each picture an exposure from a different point of view is made.

With the above mentioned and other objects in view, the invention consists in the novel construction and combination of parts hereinafter described, illustrated in the accompanying drawings and pointed out in the claims hereto appended; it being understood that various changes in the proportion, form, size and minor details of construction within the scope of the claims may be resorted to without departing from the spirit or sacrificing any of the advantages of the invention.

To more fully comprehend the invention, reference is directed to the accompanying drawings, wherein is disclosed the preferred form of apparatus for carrying out my invention.

Figure 1 is a view in side elevation of an embodiment of my invention, disclosing the base, the platform, the camera carried thereby and the means for raising and lowering the platform.

Fig. 2 is a view in front elevation disclosing the guide for causing a transverse movement of the platform on the raising or lowering thereof and illustrating in dotted lines the various positions of the camera during a complete cycle of movement thereof.

Fig. 3 is a sectional view taken on line 3—3 of Fig. 1, disclosing the means for elevating the camera.

Fig. 4 is a view in side elevation of the table carrying the platform adjustably mounted on the base.

Fig. 5 is a view in side elevation of the opposite side of the camera and mechanism from that illustrated in Fig. 1.

Fig. 6 is a detail in side elevation of the worm and sector for tilting the table.

Fig. 7 is a broken detail plan view of the gear mechanism for tilting the table.

Referring more particularly to the several views of the drawings wherein like characters of reference designate corresponding parts, 1 is a suitable supporting base adapted to be supported in any suitable manner, and the same carries the casting 2 having the upturned arms or flanges 3 between which is pivotally mounted, on the bearing screws 4, the support 5. A toothed segment 6 carried beneath the support 5 coöperates with the worm 7 on the shaft 8 which is rotatably mounted in bearings 9 in the casting 2, and said shaft has geared connection 9' with a rotatably mounted shaft 10 which is rotated in any suitable manner. The rotation of the shaft 10 tilts the support 5 which carries the table A, comprising the superimposed plates 11 and 12, which are detachably connected by the bolts 13, the plate 12 being secured by bolts 14 to the flanged top 15 of the support 5. Bearing brackets 16 extend upwardly from opposite side edges of the plate 13 and are arranged in pairs, they rotatably mounting the transversely extending cam shafts 17 which carry on their opposite ends the substantially heart-shaped cams 18 secured to rotate therewith. On the peripheral edges of the cams 18 rest the annularly grooved platform supporting wheels 19 carried by shafts 20 loosely carried in bearings 21 depending from the underside of the camera supporting platform 22.

The simultaneous rotation of the cams 18 raises and lowers the platform 22 and by loosely mounting the platform on the shafts 20 a movement of the platform longitudinally of the shafts is permitted. An angularly disposed slotted guide 23 depending from the underside of the camera supporting platform 22 and coöperating with a guide pin 24 carried by a standard 25 extending upwardly from and secured to the plate 11 controls the oblique movement of the camera supporting platform when the same is raised and lowered.

The cams 18 are rotated in the direction of the arrows, Figs. 1 and 5, by the rotation of the shaft 26 carried in bearings 27 upwardly extended from plate 11, said shaft being connected to the cam carrying shafts 17 by the worm gear connections 28.

The shaft 26 is driven off a driven shaft 29 through a bevel gear connection 30, said driven shaft 29 extending transversely of the plate 11 and supported in bearings 31 extending upwardly therefrom. The shaft 29 is driven in any suitable manner, as, for instance, by the handle 32, and said shaft carries a sprocket 33 which is connected by a flexible chain 34 with a suitable sprocket 35 freely rotatable on the rear shaft 20.

A suitable camera 36 of any well known construction for the taking of motion pictures rests on the table 22 and is supported thereby, and the same is provided with a lens mounting 37 and a suitable shutter and other mechanism operating shaft 38. The shaft is rotated to operate the shutter simultaneously with the raising and lowering of the camera obliquely by a flexible chain 39 operating over a sprocket 40 carried by the shaft 38 and also operating over a sprocket 41 carried by the hub 42 mounting the sprocket 35.

To prevent the displacement of the platform supporting wheels 19 from the cams 18, I employ a guide frame comprising the links 43 pivotally connected at one end to the driven shaft 29 and at their opposite ends to the rear cam supporting shaft 17.

A sprocket 44 carried by a bracket 45 pivotally mounted to one of the links 43 and forced upwardly by the spring 46, the tension of which is regulated by chains 47 engaging the hook 48, maintains the chain 34 under tension during the rise and fall of the camera supporting platform.

I have provided an apparatus for use in connection with the taking of motion pictures which will cause the raising and lowering of the camera vertically at an oblique angle and simultaneously with the operation of the shutter and exposure of the film. I have also provided a mechanism for maintaining the camera in its rise and fall parallel with the table A.

Having thus described my invention, what I claim as new and desire to protect by Letters Patent is:—

1. In combination with a camera for the taking of motion pictures and provided with a lens and shutter, of means for supporting the same, and mechanism for raising and lowering said camera at an oblique angle simultaneously with the operation of the shutter thereof.

2. In combination with a camera for the taking of motion pictures and provided with a lens and shutter, of a support for the same, means for raising and lowering the camera in a vertical plane, means for moving the camera in a horizontal plane during its rise and fall, and means for simultaneously operating the camera shutter during the rise and fall of the camera.

3. In combination with a camera for the taking of motion pictures and provided with a lens and shutter, of a support for the same, rotating cams for raising and lowering the support in a vertical plane, means coöperating therewith for moving the support in a horizontal plane during its rise and fall, and means operated during the movement of said cams for continuously operating the camera shutter during the rise and fall of the support.

4. In combination with a camera for the taking of motion pictures and provided with a lens and shutter, of a support for the same, means coöperating therewith for raising and lowering said support vertically at an oblique angle, and means for simultaneously operating the camera shutter during the rise and fall of said support.

5. In combination with a camera for the taking of motion pictures and provided with a lens and shutter, of a base, a table carried thereby and pivotally connected thereto, a platform above the table and on which the camera is supported, means for moving the platform vertically at an oblique angle and maintaining the same parallel with said table during its cycle of movement, and means for simultaneously operating the camera shutter during the movement of the platform.

6. In combination with a camera for the taking of motion pictures and provided with a lens and shutter, of a base, a table carried thereby and capable of angular adjustment relatively thereto, a plurality of cams carried by the table and rotating on a horizontal axis, a platform disposed above the table for supporting the camera, a plurality of grooved supporting wheels one coöperating with the periphery of each cam, shafts for supporting said wheels and rotatably and slidably mounted in bearings carried by said platform, means for simultaneously rotating said cams, for raising and lowering said platform, a guide for moving said platform longitudinally of said shafts during its rise and fall, and means for continuously operating the camera shutter during the movement thereof.

7. In combination with a camera for the taking of motion pictures and provided with a lens and shutter, of coöperating instrumentalities for moving said camera vertically at an oblique angle and for continuously operating the shutter while said camera is in motion.

8. In combination with a camera for the taking of motion pictures and provided with a lens and shutter, of coöperating instrumentalities for raising and lowering said camera at an oblique angle and for continuously operating the shutter during the rise and fall of the camera.

In testimony whereof I have signed my name to this specification in the presence of two subscribing witnesses.

CONSTANT L. DUHEM.

Witnesses:
 A. M. SMITH,
 J. A. LAWRENCE.